(12) United States Patent
Saleem et al.

(10) Patent No.: US 12,128,381 B1
(45) Date of Patent: Oct. 29, 2024

(54) MICROPOROUS THIN FILM

(71) Applicant: KING FAISAL UNIVERSITY, Al-Ahsa (SA)

(72) Inventors: Junaid Saleem, Doha (QA); S K Safdar Hossain, Hofuf (SA); Zubair Khalid Baig Moghal, Doha (QA); Gordon McKay, Doha (QA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/618,731

(22) Filed: Mar. 27, 2024

Related U.S. Application Data

(62) Division of application No. 18/236,372, filed on Aug. 21, 2023, now Pat. No. 11,958,035.

(51) Int. Cl.
| | |
|---|---|
| *B01J 20/26* | (2006.01) |
| *B01J 20/28* | (2006.01) |
| *B01J 20/30* | (2006.01) |
| *C02F 101/32* | (2006.01) |

(52) U.S. Cl.
CPC ....... *B01J 20/261* (2013.01); *B01J 20/28004* (2013.01); *B01J 20/28033* (2013.01); *B01J 20/3021* (2013.01); *B01J 20/3064* (2013.01); *B01J 20/3071* (2013.01); *C02F 2101/32* (2013.01)

(58) Field of Classification Search
CPC .... B01J 20/26; B01J 20/261; B01J 20/28004; B01J 20/28033; B01J 20/3021; B01J 20/3064; B01J 20/3071; C02F 2101/32
USPC ........................................................ 210/671
See application file for complete search history.

(56) References Cited

U.S. PATENT DOCUMENTS

2013/0099160 A1* 4/2013 Topolkaraev ........... B29C 48/11
252/194

FOREIGN PATENT DOCUMENTS

| GB | 2600490 A | 5/2022 |
|---|---|---|
| JP | H0838892 A | 2/1996 |

OTHER PUBLICATIONS

Junaid Saleem, et al., "Up-cycling plastic waste into swellable super-sorbents", Journal of Hazardous Materials, vol. 453, pp. 1-14, First available online Apr. 5, 2023.

* cited by examiner

*Primary Examiner* — Edward M Johnson
(74) *Attorney, Agent, or Firm* — Nath, Goldberg & Meyer; Joshua B. Goldberg

(57) ABSTRACT

Polypropylene (PP) and polyethylene (PE) blends derived from plastic waste streams and a method to prepare reusable oil sorbents. A method includes separating plastics of group-A from group-B using a float-sink technique, where group-A comprises various PP and PE materials, and group-B comprises polystyrene, polyethylene terephthalate, and polyvinyl chloride; dissolving the group-A plastics in a solvent; adding a cavity forming agent to the solution; applying the solution onto a solid substrate through spin-coating followed by controlled heating; and extracting the cavity forming agent, obtaining a thin film sorbent with swellable cavities for oil sorption. The film contains 400-800 swellable 3D cavities/cm$^2$, each cavity capable of swelling 20-30 times the thickness of the film when contacted with oil. The method improves compatibility of PP-PE blends without using compatibilizers, resulting in high oil uptake capacity due to swellable cavities, and reusability of sorbent with an oil recovery of more than 98%.

17 Claims, 10 Drawing Sheets

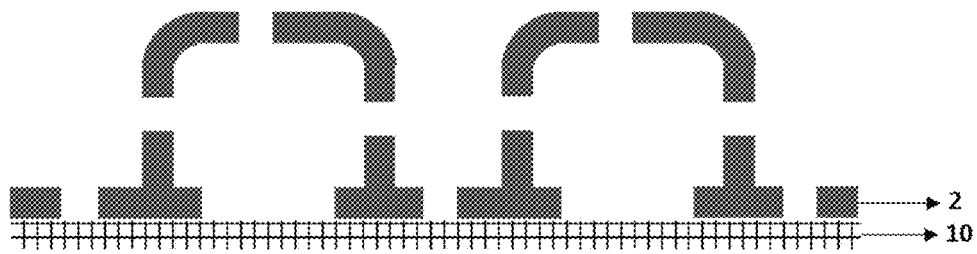
*FIG. 8*
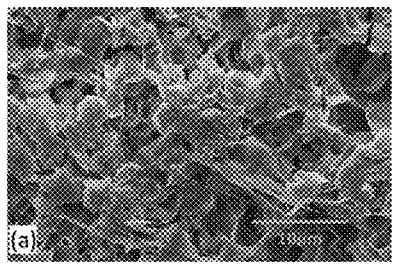
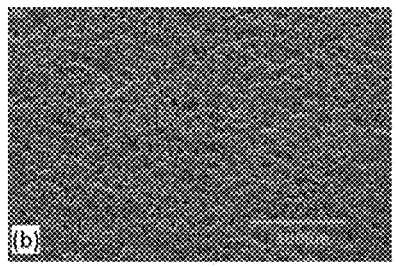
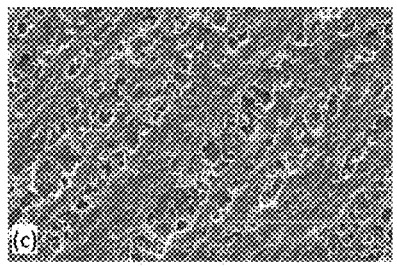
*FIG. 9A*  *FIG. 9B*  *FIG. 9C*
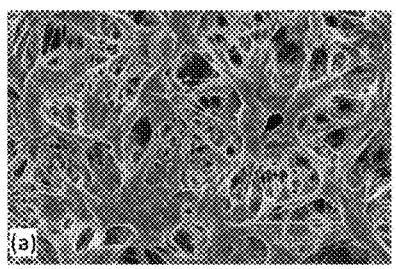
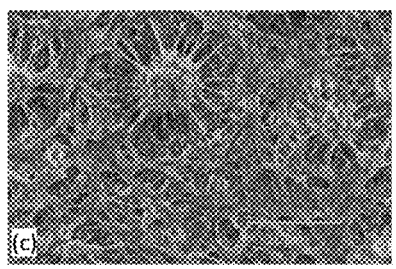
*FIG. 10A*  *FIG. 10B*  *FIG. 10C*

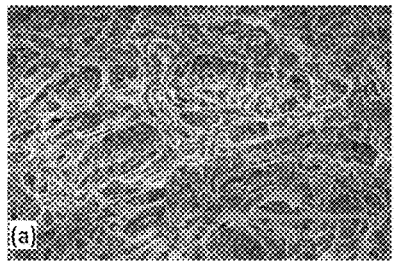 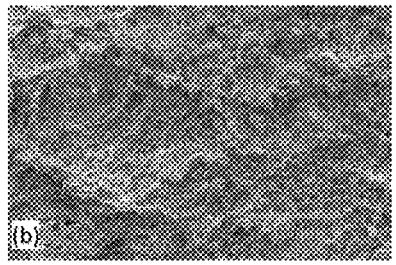 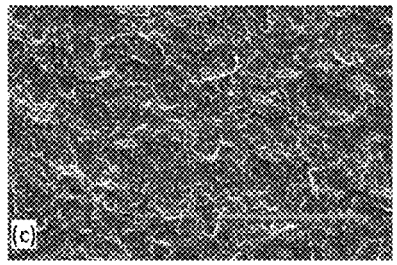
    *FIG. 11A*        *FIG. 11B*        *FIG. 11C*
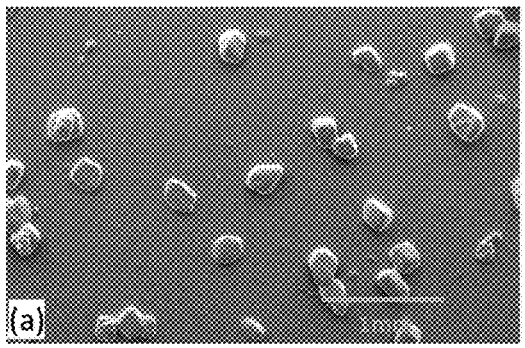 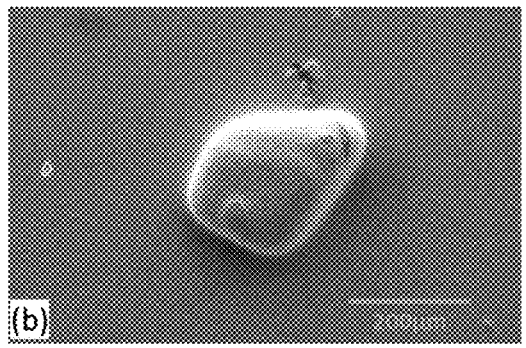
    *FIG. 12A*        *FIG. 12B*
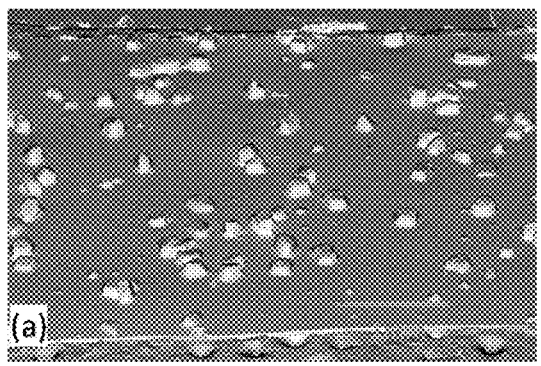 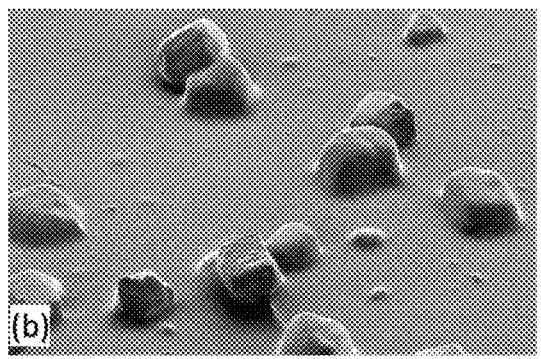
    *FIG. 13A*        *FIG. 13B*

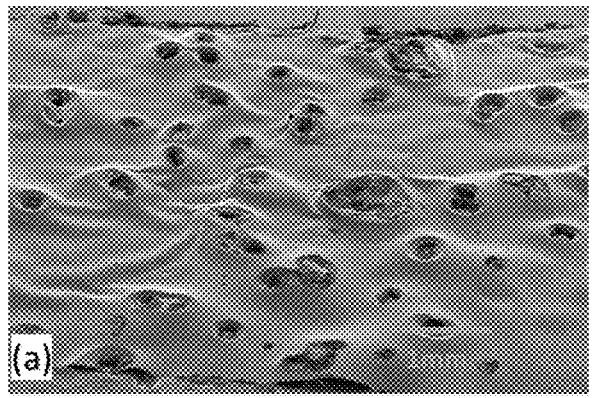 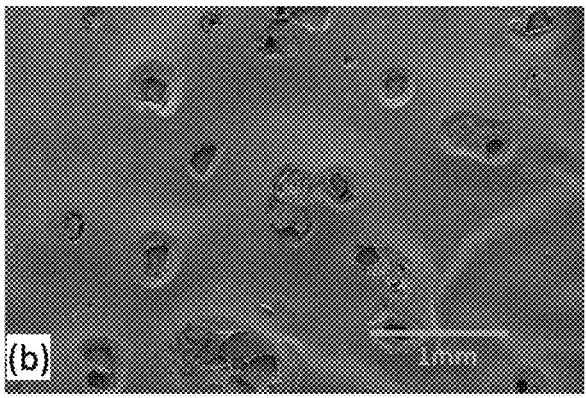
FIG. 14A        FIG. 14B
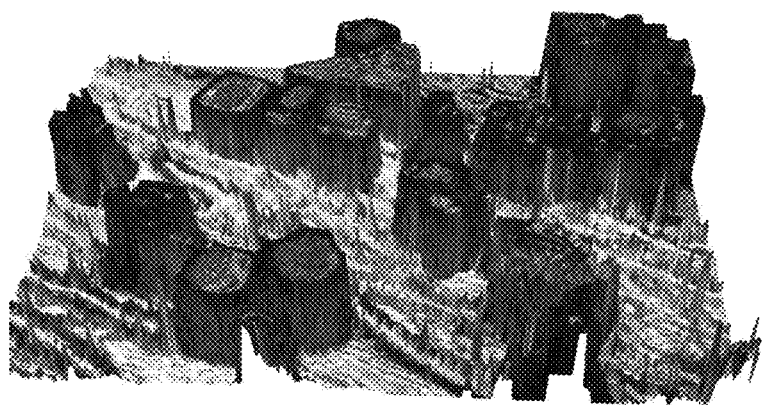
FIG. 15

MICROPOROUS THIN FILM

CROSS-REFERENCE TO RELATED APPLICATION

This application is a divisional of U.S. patent application Ser. No. 18/236,372, filed on Aug. 21, 2023, the entire contents of which are incorporated herein by reference.

BACKGROUND

1. Field

The present disclosure relates to polypropylene (PP) and polyethylene (PE) blends with improved compatibility derived from plastic waste streams and a method to prepare PE-PP based reusable oil sorbents with swellable cavities.

2. Description of the Related Art

Plastic waste constitutes around 15% of total municipal solid waste. A large volume of plastic waste is thrown into the ocean which creates further problems as around 13 million tons of plastic is ingested by seabirds and fish. In addition, it is estimated that around 380 million tons of plastic is manufactured every year, and less than 20% is recycled. Further, 20,000 plastic bottles are produced per second and less than 10% of them are recycled. With this rate, it is projected that by 2050 the oceans will contain more plastic by weight than fish if proper recycling measures are not taken.

A typical stream of plastic waste comprises polyethylene terephthalate (PET), high density polyethylene (HDPE), polyvinyl chloride (PVC), Low density polyethylene (LDPE)/linear low density polyethylene (LLDPE), polypropylene (PP), and polystyrene (PS) as categorized by SPI (Society of the Plastics Industry) with the code numbers from 1 to 6, respectively. The polyolefins, which comprise LDPE/LLDPE, PP and HDPE, contribute to 60% of total plastic waste. The plastic waste stream can be sorted out by using the float-sink technique, in which the plastics that need to be separated are submerged in a fluid with varying densities, allowing lighter components to float and denser ones to sink.

Since polyethylene (including LDPE, LLDPE, and HDPE) and polypropylene have a lower density than water compared to PS, PET, and PVC, PP and PE float and the others sink. Secondly, PP and PE are not easily separated from each other in the recycling stream due to their similar densities; thus, energy-intensive processes are required for further separation. Alternatively, they can be blended to prepare a new composition; however, their inherently limited compatibility and miscibility result in a phase separation during cooling and crystallization, reflecting the poor mechanical properties of the blends. This problem can be overcome by using a compatibilizer such as ethylene-propylene copolymers. The compatibilizer controls the phase behavior of the mixture and is similar to a surfactant developed for stabilizing immiscible water/oil mixtures. However, each compatibilizer has its limitations, such as increasing the cost of the process and limiting the stiffness of the composition.

One way to overcome compatibility issues without needing a compatibilizer is to prepare a dilute solution of PP and PE blend in a suitable solvent such as Xylene and to avoid using conventional blending techniques using an extruder and/or melt blender. By dissolving PP and PE in a common solvent, both polymers' chains separate through the diffusion of the solvent molecules into the polymer structures. This creates more free space between the chains so that the PE and PP chains are too far from each other, especially in a dilute solution. In this case, the two polymers can be combined in fiber through the solution. On the contrary, in melt extrusion PE and PP chains will stick together and be extruded as separate incompatible entities. The diluted solution prepared using this method can be used for a variety of applications to produce various products comprising PE and PP with better compatibility, such as in the preparation of membranes, battery separators, oil sorbents, pollutant removal from water, and as a support material for thin film coatings, etc.

Commercial sorbent pads and sheets made from polyolefins comprise non-woven fabric to form a thin film of 10 to 30 μm. These films are stacked to make a thick sorbent pad, as in the case of 3M-HP-255, 3M-156, Chemtex-BP-9W, and Alsorb. They are produced by spinning polypropylene using heat and air into long fluffy fibers or threads, then pressing the fibers together between hot rollers to get a flexible solid fabric thin film. The minimum thickness of these pads is 5 mm, which enforces a limit on the number of such pads which may be kept in a given space. Moreover, for thin water-borne oil films, these pads and sheets pick up undesirable water as a portion of these materials floats below the oil surface, i.e., in the water. In this regard, there is a need to prepare thin films that can effectively remove oil and store it in a smaller space than thick pads and sheets.

Thus, further methods and products for reusing waste polypropylene and polyethylene materials solving the aforementioned problems are desired.

SUMMARY

The present disclosure is directed towards isolating polyolefins from a stream of plastic waste, preparing a blend of polyethylene and polypropylene with improved compatibility, and using this blend to prepare a thin film with pores, macro-voids, and swellable cavities. This thin film can be used for oil and organic sorption purposes; however, it can also be used for other applications including but not limited to material storage.

Accordingly, one embodiment of the present subject matter is directed to the isolation of polyolefins from a stream of plastic waste.

In another embodiment, the present subject matter is directed to blending waste polyolefins comprising Low density Polyethylene (LDPE), Linear low-density polyethylene (LLDPE), High density polyethylene (HDPE), and Polypropylene (PP) with a flexible mixing ratio and improved compatibility without using a compatibilizer.

In a further embodiment, the present subject matter is directed to using the PP-PE blend for preparing a thin film with pores, macro-voids, and/or swellable cavities for oil sorption applications.

In an embodiment, the present subject matter relates to a process for preparing a microporous thin film from a plastic waste stream, the process comprising: collecting a plastic waste stream; shredding plastic in the plastic waste stream into pieces, thereby obtaining shredded plastic; rolling and mixing the shredded plastic in water to obtain a mixture; separating polyolefins from other plastics in the mixture using a float-sink method to obtain separated polyolefins; dissolving the separated polyolefins in an organic solvent to obtain a solution; adding a cavity forming agent to the solution until the cavity forming agent is well-dispersed therein; applying the solution onto a solid substrate through spin-coating to obtain a substrate coated with a thin film; subjecting the thin film to heat thereby strengthening the thin film; peeling the thin film off the substrate to obtain a peeled thin film; and extracting the cavity forming agent from the peeled thin film by dissolving the peeled thin film in a suitable solvent, thereby obtaining a microporous thin film with macro-voids and cavities.

In another embodiment, the present subject matter relates to a microporous thin film prepared according to the processes as described herein.

In a further embodiment, the present subject matter relates to a method of absorbing oil from a sample, the method comprising contacting the sample with the microporous thin film as described herein; and absorbing the oil onto the microporous thin film.

These and other features of the present subject matter will become readily apparent upon further review of the following specification.

BRIEF DESCRIPTION OF THE DRAWINGS

FIG. 8 is a schematic representation of the thin film with a cavity supported on a nonwoven polypropylene fabric.

FIGS. 9A-9C are SEM images of PE (FIGS. 9A and 9B) before heating and (FIG. 9C) after heating.

FIGS. 10A-10C are SEM images of PP (FIGS. 10A and 10B) before heating and (FIG. 10C) after heating.

FIGS. 11A-11C are SEM images of HDPE-PP blend (FIGS. 11A and 11B) before heating and (FIG. 11C) after heating.

FIGS. 12A and 12B show SEM images of HDPE-PP blended thin film with cavities.

FIGS. 13A and 13B show SEM images of HDPE-PP blended film's cavities in a tilted position, showing cavities in the third dimension.

FIGS. 14A and 14B show SEM images of HDPE-PP blended thin film's bottom surface showing cavity openings.

FIG. 15 shows a 3D image of the HDPE and PP thin film showing cavity using a profilometer.

Similar reference characters denote corresponding features consistently throughout the attached drawings.

DETAILED DESCRIPTION OF THE PREFERRED EMBODIMENTS

Figure 1:
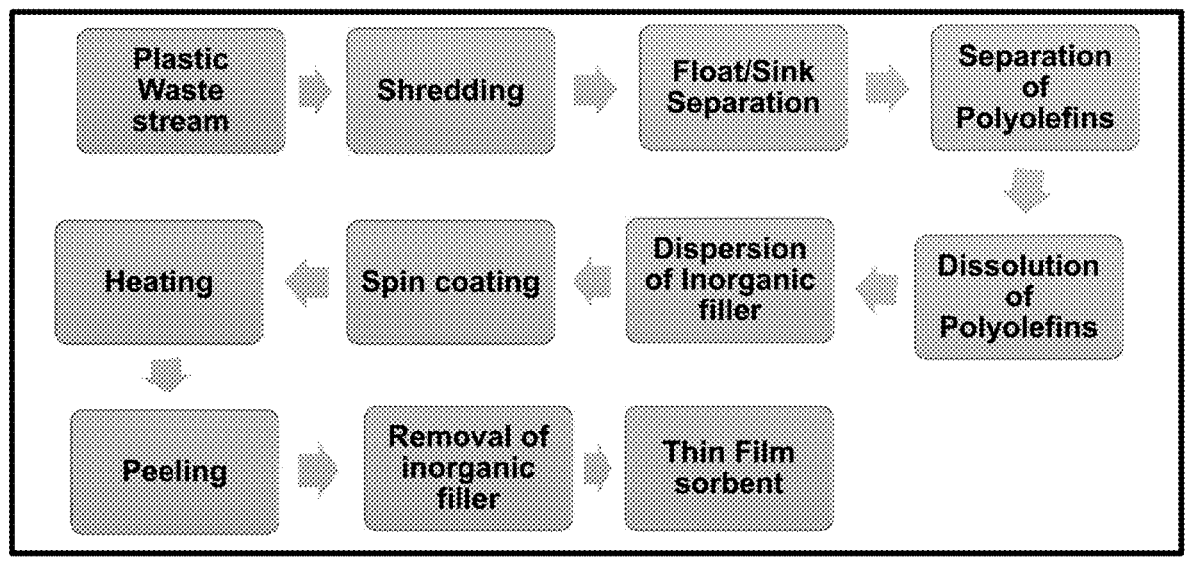
FIG. 1 is a schematic representation of a process for producing a thin film sorbent from a stream of plastic waste.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

"Recycled waste" or "recycled material" as described herein relates to waste material recovered from industrial or post-consumer waste. "Post-consumer waste" as described herein refers to items that have at least finished their first use cycle whereas "Industrial waste" as described herein refers to production waste that does not reach a customer in general.

The term "polyolefin" as used herein is intended to include PE (polyethylene) comprising LDPE (low-density polyethylene), LLDPE (linear low-density polyethylene), HDPE (high-density polyethylene), UHMWPE (ultrahigh molecular weight polyethylene); and PP (polypropylene).

The term "porous" as used herein refers to a plurality of pores provided in a thin film. Further, the pores may or may not penetrate through the thin film. A porous thin film may have penetrating pores and non-penetrating pores.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a process for preparing a microporous thin film from a plastic waste stream, the process comprising: collecting a plastic waste stream; shredding plastic in the plastic waste stream into pieces, thereby obtaining shredded plastic; rolling and mixing the shredded plastic in water to obtain a mixture; separating polyolefins from other plastics in the mixture using a float-sink method to obtain separated polyolefins; dissolving the separated polyolefins in an organic solvent to obtain a solution; adding a cavity forming agent to the solution until the cavity forming agent is well-dispersed therein; applying the solution onto a solid substrate through spin-coating to obtain a substrate coated with a thin film; subjecting the thin film to heat thereby strengthening the thin film; peeling the thin film off the substrate to obtain a peeled thin film; and extracting the cavity forming agent from the peeled thin film by dissolving the peeled thin film in a suitable solvent, thereby obtaining a microporous thin film with macro-voids and cavities.

According to one embodiment, wherein the microporous thin film prepared according to the present methods can have macro-voids and cavities and can be used as an oil sorbent.

In another embodiment, the separated polyolefins can be selected from the group consisting of polypropylene (PP), high density polyethylene (HDPE), low density polyethylene (LDPE), linear low density polyethylene (LLDPE), and mixtures or combinations thereof.

In a further embodiment, the solid substrate before the spin coating can be pre-heated to a temperature of about 80° C. to about 160° C. Regardless of whether the solid substrate is pre-heated, the spin coating can occur for about 1 to about 10 minutes and can be conducted at an rpm of about 100 to about 6000. In certain embodiment, the spin coating can be conducted at an rpm of about 2000 to about 3000 to obtain an ultra-thin film thickness of about 100 nm. In other embodiments, the spin coating can be conducted at an rpm of about 1500 to about 2000 to obtain a thin film thickness of about 500 nm to about to 1 µm. In alternative embodiments, the spin coating can be conducted at an rpm of about 1000 to about 1500 to obtain a thin film thickness of about 1 µm to about to 100 µm.

In an embodiment of the present processes, the suitable solvent can be selected from the group consisting of an aqueous solvent selected from the group consisting of pure water, distilled water, deionized water, acidic aqueous solution, basic aqueous solution, and a buffer; an inorganic acidic solvent; an inorganic basic solvent; an organic solvent; an ionic liquids; and a mixture or combination thereof.

In another embodiment of the present processes, the organic solvent can be selected from the group consisting of p-xylene, m-xylene, o-xylene, an isomeric mixture of xylenes, toluene, other compatible aromatic hydrocarbons, and a mixture or combination thereof. In this regard, the separated polyolefins can be dissolved in the organic solvent in a ratio of about 1 mg/ml to about 200 mg/ml.

In a further embodiment of the present processes, the cavity forming agent can be selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a mixture or combination thereof. In this regard, the cavity forming agent can be added to the solution in a ratio of separated polyolefins to cavity forming agent of about 1:0 w/w % to about 1:4 w/w %.

In an embodiment of the present processes, the solid substrate can be selected from the group consisting of glass, copper, silicon, alumina, and another metal surface.

In certain embodiments, the following stages of the present processes may be adopted to achieve desirable films:
Stage 1:
Factors Affecting the Size of the Cavity Opening:

For large cavity openings, the solid substrate should be preheated and for small cavity openings, the solid substrate is not required to be preheated. For large cavity openings, the contact area of the cavity forming agent with the surface of the solid substrate should be high. It can be achieved by using a cubic or cuboid-shaped cavity forming agent. For small cavity openings, the contact area of the cavity forming agent with the surface of solid substrate should be small, which can be achieved by using a spherical-shaped cavity forming agent. For large cavity openings, the viscosity of the polymer solution should be high and for small cavity openings the viscosity of the polymer solution should be low.
Factors Affecting the Size of Macro-Voids:

The macro-voids are created when the centrifugal forces overcome the retention forces of the polymer. These centrifugal forces can be caused by the combination of two forces created by the mass of the cavity forming agent and the speed of the rotation.

For larger macro-voids, the ratio of polymer to the cavity forming agent should be small and for smaller macro-voids, the ratio of the polymer to the cavity forming agent should be high. For larger macro-voids, the speed of the rotation should be high and for smaller macro-voids the speed of rotation should be low. For larger macro-voids, the viscosity of the polymer solution should be low and for smaller macro-voids the viscosity of the polymer solution should be high.

Role of RPM on the Formation of Macro-Voids and Cavity Openings:

For macro-voids with large cavity openings the rpm should range from about 600 to about 900 with a pre-heated solid substrate. For macro-voids with small cavity openings, the rpm should range from about 600 to about 900 without a pre-heated solid substrate. For large cavity openings with no macro-voids, the rpm should range from about 300 to about 500 with a pre-heated solid substrate. For small cavity openings with no macro-voids, the rpm should range from about 300 to about 500 without a pre-heated solid substrate.

Stage 2:

This stage is crucial to obtain a uniform thin film to ultra-thin film ranging from about 500 nm to about 100 μm. The rpm in this step can range from about 1000 to about 3000. To achieve an ultra-thin film thickness of about 100 nm, the rpm should be in the range of about 2000 to about 3000. To achieve a thickness of about 500 nm to about 1 μm, the rpm should be in the range of about 1500 to about 2000. To achieve a thickness of about 1 μm to about 100 μm, the rpm should be in the range of about 1000 to about 1500. To achieve the lower end thickness, a preheated solid substrate should be used while to achieve higher end thickness, a solid substrate should be used at ambient temperature.

Stage 3:

This step is crucial to remove the solvent. The rpm in this step ranges from about 3000 to about 6000. The excess polymer and the solvent can be collected from the drain connected to the vacuum and recycled.

After the completion of spin coating, the solid substrate with thin film can be detached from the chuck or spin coater.

The solid substrate with the polymer thin film may or may not be heated to a temperature up to the melting point of the polymer or above. The heating of the solid substrate with thin film after the spin coating is termed here as "post-heat." The post heat treatment ranges from about 20 to about 160° C. or at a temperature up to the melting point of polymer(s) or above for a time range from about 5 seconds to about 30 minutes.

The post-heated thin film can be peeled off easily and effortlessly resulting in an independent, free-standing, strong and porous thin film without any support.

The post-heated thin films can be washed to extract out the cavity forming agent using an aqueous or non-aqueous solvent, thereby obtaining a porous thin film.

The solid substrate may include glass, copper, silicon, alumina, or other metal surfaces. The solid surface temperature can range from about 0° C. to about 130° C. or the temperature below the boiling point of the solvent.

In an embodiment, the size of the cavity forming agent could be in the range of about 3 μm to about 200 μm, or the size of the cavity forming agent could be greater than the size of the targeted thickness of the thin film.

In a further embodiment, the present subject matter relates to a microporous thin film prepared according to the process described herein.

In an embodiment, the microporous thin film can have about 400 to about 800 swellable 3D cavities per cm$^2$. In this regard, the swellable 3D cavities can be capable of swelling about 20 to about 30 times a thickness of the microporous thin film when contacted with oil.

In another embodiment, the microporous thin film can have a thickness of about 500 nm to about 100 μm, or from about 2 μm to about 100 μm.

In certain embodiments, the area of the thin film can range from about 1 cm$^2$ to about 1296 cm$^2$, or more, with a diameter of the film ranging from about 1 cm to about 36 cm, or more.

In other embodiments, the size of the cavity can depends on the dimension of the cavity forming agent and can range from about 3 μm to about 200 μm.

In further embodiments, the porosity of the thin film obtained can be in the range of about 1% to about 82%.

In certain embodiments, the tensile strength of the as prepared films can be up to about 30 MPa.

Any dimension as used herein in this regard refers to length and/or breadth and/or depth/height.

In another embodiment, the present subject matter relates to a method of absorbing oil from a sample, the method comprising contacting the sample with the microporous thin film as described herein; and absorbing the oil onto the microporous thin film.

In this regarding the present methods are capable of absorbing oil from a sample such that at least about 98% of the oil in the sample can be absorbed onto the microporous thin film, either over one or multiple contacts.

FIG. 1 shows the process of separation of polyolefins from a stream of plastic wastes utilizing them and converting them to thin films. Initially, plastic waste is collected comprising six different types of plastics including PET, HDPE, PP, LLDPE/LDPE, PS, and PVC. The stream of plastic wastes is shredded to small pieces using a shredder. Then, the plastic waste is washed and rolled in water to separate the plastic based on their densities. HDPE, LDPE, LLDPE, and PP plastic waste possess a density less than the density of water, thus they float on the water surface. The remaining plastic wastes are submerged in the water, which are separated out. The plastic waste that floats is collected and poured into a container for further processing and to produce a thin film sorbent.

Figure 2:
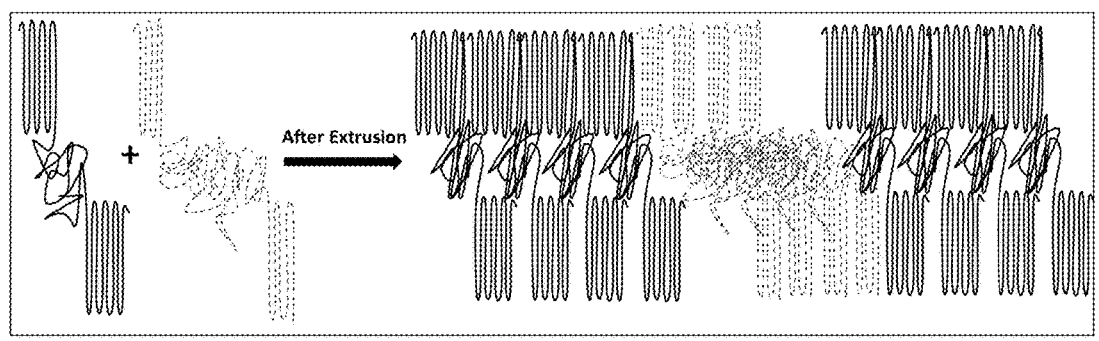
FIG. 2 shows compatibility issues that arise between PP (dotted line) and PE (solid line) during extrusion.

FIG. 2 shows the compatibility issues observed when two immiscible polymers are mixed using an extrusion process. Usually, compatibilizers (copolymers) are used to prepare a blend of two different polymer. A copolymer is a third entity that contains both the chemical moieties that are present in individual polymer. In melt extrusion, PE and PP chains will stick together and be extruded as separate incompatible entities. Thus, the resulting blend is heterogenous and incompatible.

Figure 3:
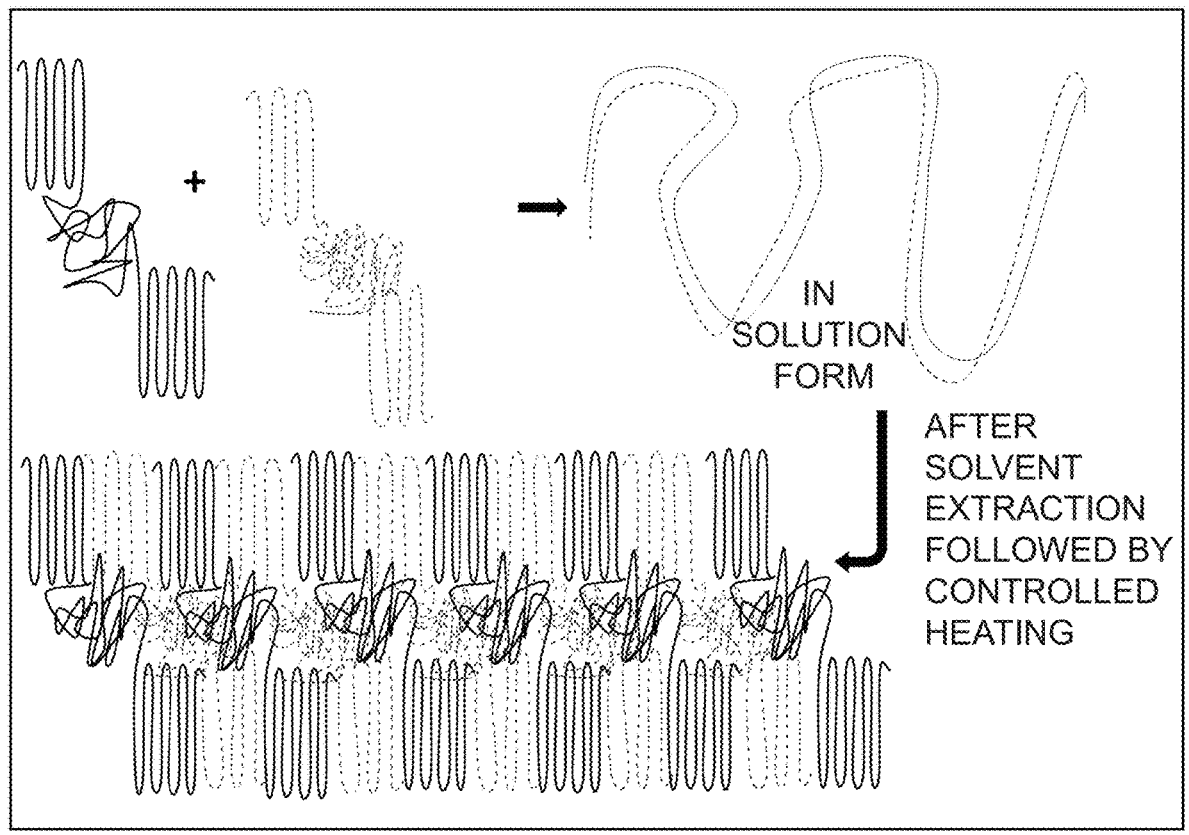
FIG. 3. Shows how compatibility issues between PP (dotted line) and PE (solid line) can be addressed.

FIG. 3 shows a process to overcome the compatibility issues when two different polymers are mixed without using a compatibilizer. When the polymer is dissolved in a suitable solvent, the solvent molecules enter the polymeric chains and enlarge the space between the polymer chains. When the two different polymers are mixed in a solvent, the probability of mixing two different polymeric chains is increased, thereby increasing the compatibility. When the solvent is removed from the polymer mixture, the different polymers are connected more uniformly compared to the extrusion mixing.

Figure 4:
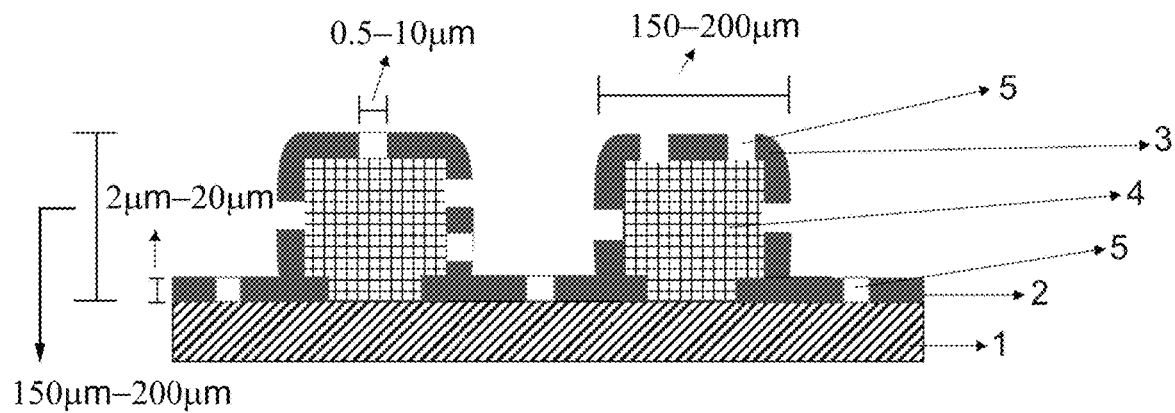
FIG. 4 is a schematic cross-sectional view of the porous thin film with micropores, having prefilled cavities with cavity forming agent before peeling off from substrate.

FIG. 4 shows a schematic cross-sectional view of the porous thin film with micropores, prefilled cavities with cavity forming agent before peeling off from substrate. A porous thin film 2 made of polyolefin was prepared using the spin coating technique. The porous thin film 2 has prefilled cavities 3 with cavity forming agent 4 resting on the substrate 1. The thickness of the thin film 2 can range between about 2 µm and about 100 µm or, in certain embodiments, between about 2 µm and about 20 µm. The dimension of the cavity forming agent can range from about 3 µm to about 200 µm, or, in certain embodiments, between about 150 µm and about 200 µm. The height of the cavity forming agent can range from about 3 µm to about 200 µm, or, in certain embodiments, between about 150 µm and about 200 µm. The porous thin film on the substrate prepared using the spin coating method prefilled with cavity forming agent in this FIG. 4 is not yet peeled off.

Figure 5:
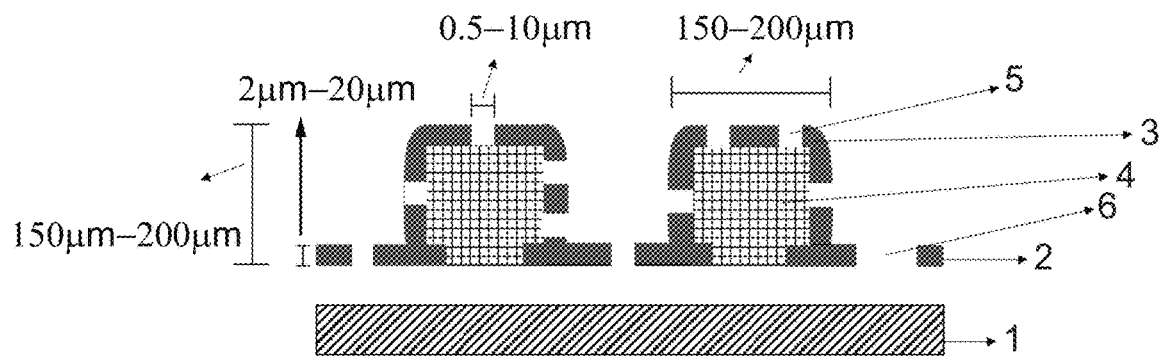
FIG. 5 is a schematic cross-sectional view of a porous thin film with micropores, macro-voids, and prefilled cavities with cavity forming agent separated from the solid substrate.

FIG. 5 shows a schematic cross-sectional view of a porous thin film with micropores, macro-voids, and prefilled cavities with cavity forming agent separated from the solid substrate. A porous thin film made of polyolefin was prepared using the spin coating technique. The porous thin film 2 with prefilled cavities 3 with cavity forming agent 4 resting on a substrate 1 has a thickness ranging between about 2 µm and about 100 µm or, in certain embodiments, between about 2 µm and about 20 µm. Micropores 5 can be through-pores and can range between about 0.5 µm and about 10 µm or, in certain embodiments, between about 500 nm and about 5 µm. Macro-voids 6 are through-pores and can range between about 10 µm and about 200 µm or above, or, in certain embodiments, between about 30 µm and about 100 µm. These macro-voids are formed near the cavities. They are formed when the initial spin coat speed is high (above 600 rpm). If the macro-voids are not desired, then the initial speed of the spin coat should be below 500 rpm.

The porous thin film on the substrate prepared using the spin coating method prefilled with a cavity forming agent is subjected to heat before peeling off. The solid substrate can be a glass surface or metal surface. The glass substrate is heated to a temperature ranging between about 130° C. and about 170° C. or a temperature below the melting point of the polymer. After heating, the thin film can be peeled off using a tweezer resulting in a freestanding thin film without getting collapsed and can be independently held without any other support either on complex support or individual microporous support. The post-heated thin films prepared through spin coating can have a mechanical tensile strength of about 1 to about 30 MPa or above, or, in certain embodiments, about 8 to about 15 MPa.

Figure 6:
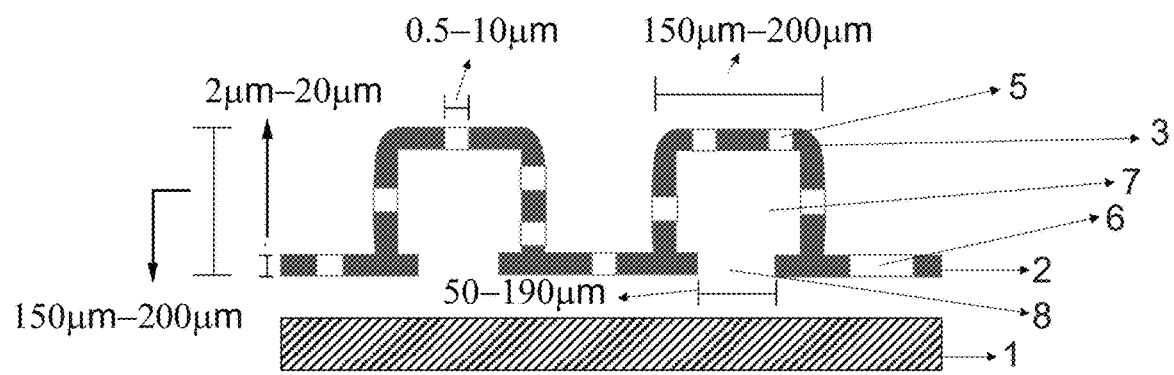
FIG. 6 is a schematic cross-sectional view of a freestanding porous thin film with micropores, macro-voids, and empty cavities with no cavity forming agents.

FIG. 6 shows a schematic cross-sectional view of a freestanding porous thin film with micropores, macro-voids, and empty cavities with no cavity forming agents. A porous thin film made of polyolefin was prepared using the spin coating technique. The porous thin film 2 with empty cavities 7 was prepared through spin coating. The peeled layer was washed in water to achieve a thin film with empty cavities. The thin film 2 was washed in water to remove cavity-forming agent, creating swellable cavities 7. Then the thin film is washed in water to remove cavity forming agent, thus empty cavities with capacity storage are formed.

Figure 7:
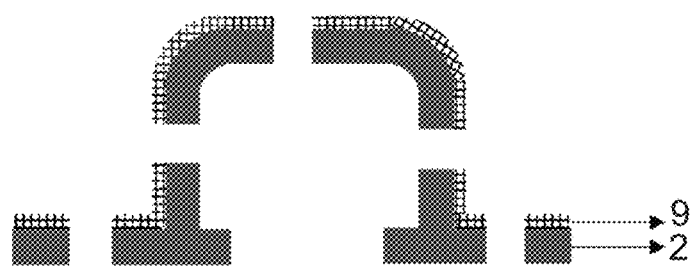
FIG. 7 is a schematic representation of the thin film covered with superhydrophobic coating.

FIG. 7 shows a schematic representation of the thin film covered with superhydrophobic coating. The thin film 2 with cavities is laminated with a nano hydrophobic layer 9 to make the thin film superhydrophobic. The lamination or coating can be done with a chemical vaporization technique or physical vaporization technique. The thin film can be laminated with functionalization of any composition of interest as required for the application.

FIG. 8 shows a schematic representation of thin film with a cavity supported on a nonwoven polypropylene fabric. A thin film is rested on a support made of nonwoven polypropylene fabric. This support can enhance the strength, durability, and recyclability. The pores of the nonwoven fabric can be more than 1 mm, thus it does not hinder the mechanism of oil sorption.

FIG. 9 shows SEM images of PE (FIGS. 9A and 9B) before heating and (FIG. 9C) after heating. The HDPE before heating is arranged in petals or flakes. The flakes are visualized in FIGS. 9A and 9B and they are arranged uniformly; however, they don't have any strength. Upon heating the flakes melt and pack closely to form porous structure as shown in FIG. 9C.

FIG. 10 shows SEM images of PP (FIGS. 10A and 10B) before heating and (FIG. 10C) after heating. The PP porous thin film before heating shows fibrous strands that are interconnected. The PP before heating is arranged in a mesh-like fibrous strands. Although the porosity is high, the structure is weak and brittle. Upon heating the mesh-like structure melts and pack closely to form a porous structure as shown in FIG. 10C.

FIG. 11 shows SEM images of HDPE-PP blend (FIGS. 11A and 11B) before heating and (FIG. 11C) after heating. SEM images of the HDPE-PP porous thin film show a mixture of petals and mesh-like structures intertwined homogenously. The HDPE-PP blend before heating is arranged in a homogenous interconnected porous net-like structure. Although the porosity is high, the structure is weak and brittle. Upon heating the flake and mesh-like structure melt and pack closely to form a porous structure as shown in FIG. 11C.

FIG. 12 shows SEM images of HDPE-PP blended thin film with cavities. FIG. 12 shows a porous thin film with a cavities from the top surface. The porous thin film is made of HDPE and PP (50:50) with cavities. The dimension of the cavities can range from about 3 µm to about 200 µm, or, in certain embodiments about 150 µm to about 200 µm. The height of the cavity can range from about 3 µm to about 200 µm, or, in certain embodiments, from about 150 µm to about 200 µm.

FIG. 13 shows SEM images of HDPE-PP blended film's cavities in a tilted position, showing cavities in the third dimension. FIG. 13 shows a porous thin film with cavities from the tilted position. The porous thin film is made of HDPE and PP (50:50) with cavities.

FIG. 14 shows SEM images of HDPE-PP blended thin film's bottom surface showing cavity openings.

FIG. 15 shows a 3D image of the HDPE and PP thin film showing cavity using a profilometer.

Figure 16:
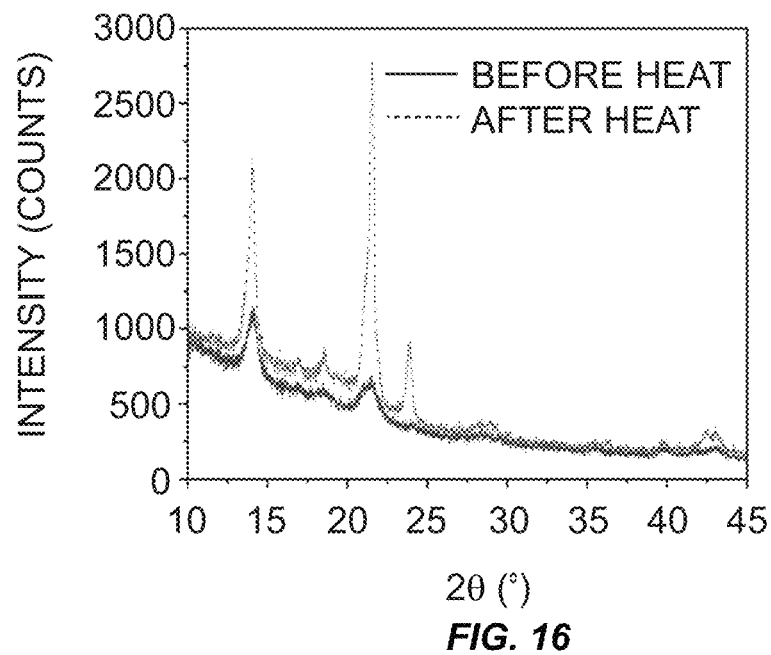
FIG. 16 shows XRD spectra of HDPE and PP (50:50) before and after heating.

FIG. 16 shows XRD spectra of HDPE and PP (50:50) before and after heating. After the completion of spin coating, the thin films are subjected to X-ray Diffraction. The thin film that is not heated after spin coat could not be peeled off as it breaks into pieces upon separation. If the thin film is heated after spin coat, the film is separated from the substrate easily. XRD spectra of HDPE before and after heat shows a high variation in peak intensity. The unheated thin film shows less intensity and is found to be more amorphous and the heated thin film shows more intensity and is found out to be more crystalline. Thus, the heated thin film shows crystalline behavior compared to unheated thin film. It is anticipated that after heating, the polymer chains become soft, align and pack closely which is attributed to the increase in intermolecular forces and dispersion forces that bind one polymer chain to other.

Figure 17:
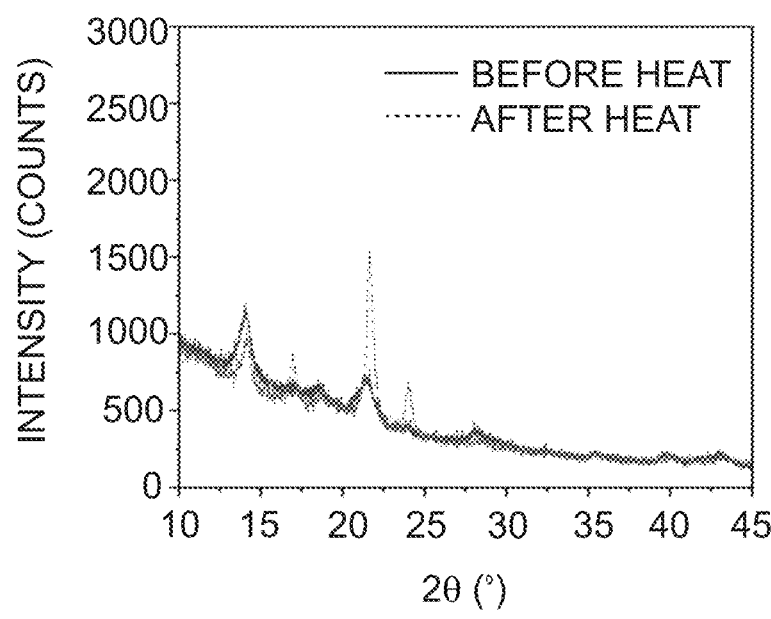
FIG. 17 shows XRD spectra of HDPE, UHMWPE, and PP (42.5:15:42.5) blend before and after heat.

FIG. 17 shows XRD spectra of a HDPE, UHMWPE, and PP (42.5:15:42.5) blend before and after heat.

Figure 18:
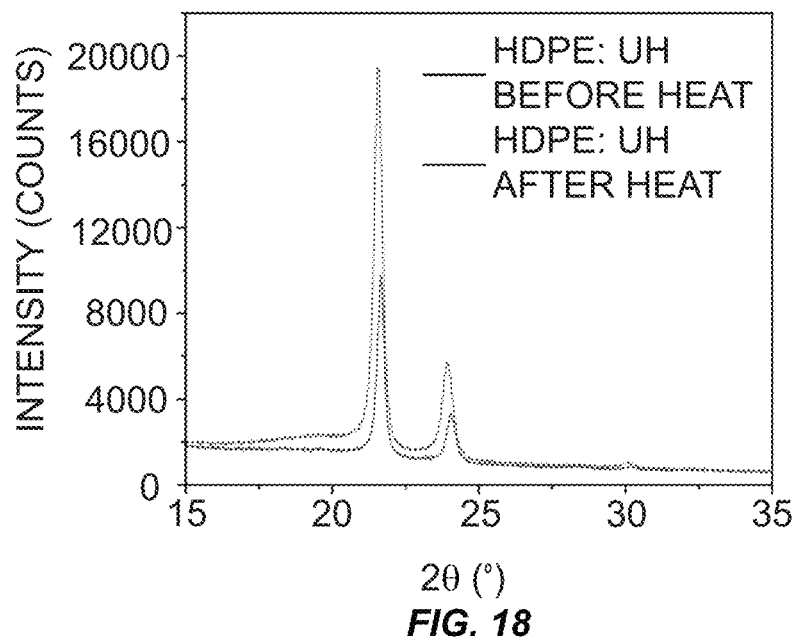
FIG. 18 shows XRD spectra of HDPE and UHMWPE (85:15) blend before and after heat.

FIG. 18 shows XRD spectra of a HDPE and UHMWPE (85:15) blend before and after heat.

Figure 19:
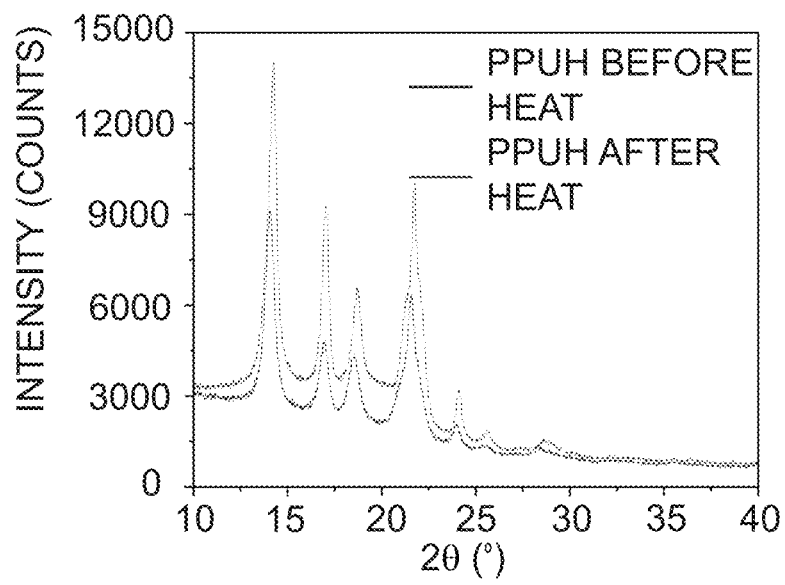
FIG. 19 shows XRD spectra of PP and UHMWPE (85:15) blend before and after heat.

FIG. 19 shows XRD spectra of a PP and UHMWPE (85:15) blend before and after heat.

Figure 20:
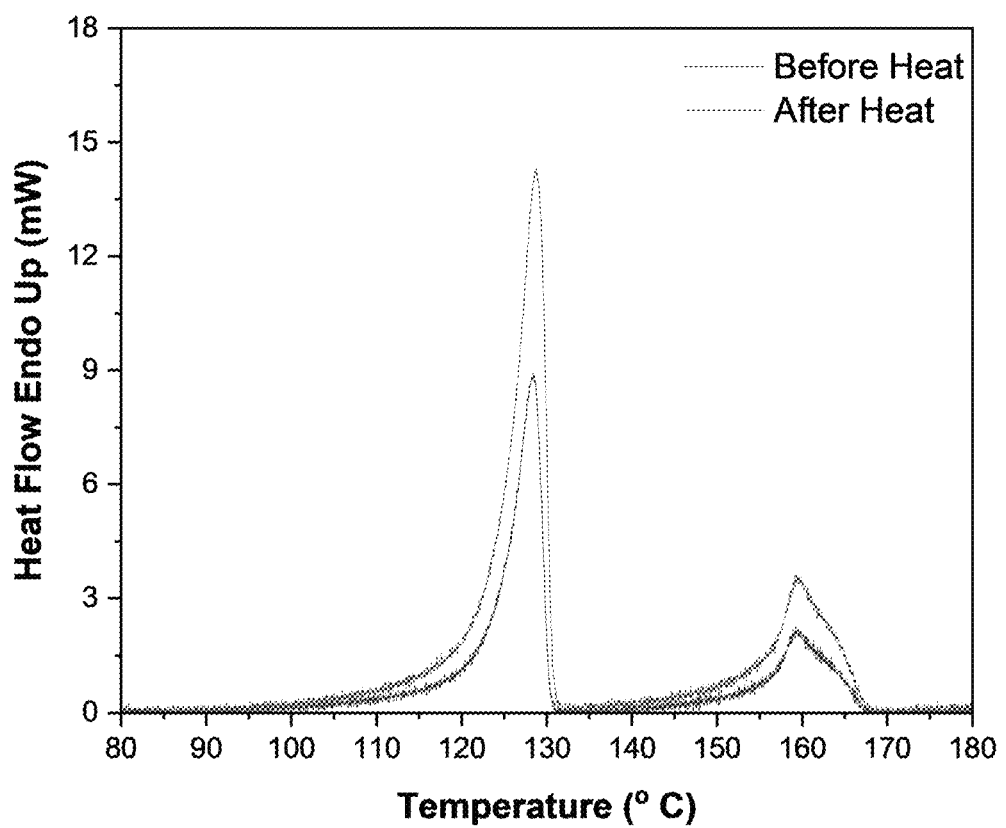
FIG. 20 shows DSC spectra of HDPE and PP before and after heat.

FIG. 20 shows DSC spectra of HDPE and PP before and after heat. After the completion of spin coating, the thin films are subjected to DSC. Differential scanning calorimetry of HDPE and PP blend before and after heat shows a significant change in enthalpy. The enthalpy change in the unheated thin film is less compared to the heated thin film. This high enthalpy in heated thin films showed more crystalline character.

Figure 21:
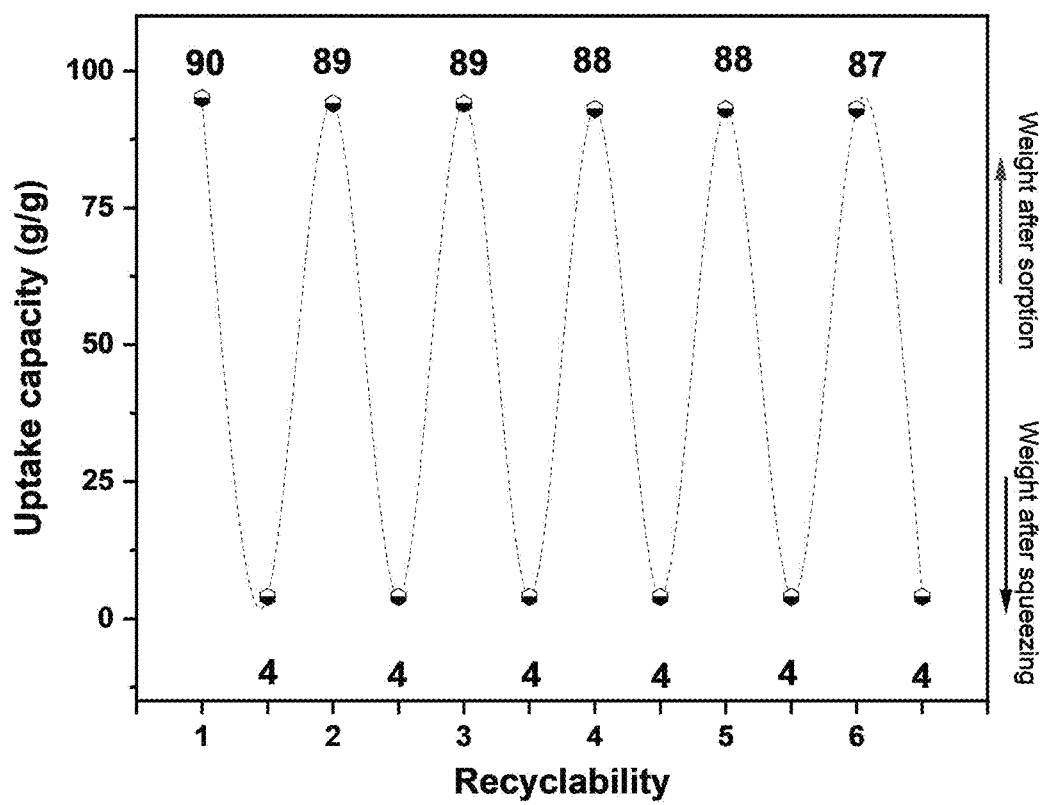
FIG. 21 shows a recyclability plot for PP, HDPE and UHMWPE thin film in oil sorption.

FIG. 21 shows a recyclability plot for PP, HDPE and UHMWPE thin film in oil sorption. The recyclability of the oil sorption shown in FIG. 21 is performed using example 2. A sample with an area of 16 cm² and a thickness of 5 µm is taken. The sorbent is dipped in an engine oil till saturation is achieved. The film is then removed from the oil and weighed after dripping for five minutes. The oil uptake capacity was found to be 95 g/g. Then the sorbent is mechanically squeezed by pressing upper and lower surface to remove oil from it and weighed again. The residual uptake value is found to be 4 g/g, which suggested that some oil is retained inside the pores of the sorbent. The process is repeated several times as shown in FIG. 21. The oil recovery is 98%.

In certain embodiments, the film can have an oil or organics uptake capacity in a range of 140 to 180 g/g measured immediately after taking out the film from an oil bath. In other embodiments, the film can have an oil or organics uptake capacity in a range of 90 to 110 g/g measured after oil dripping of 5 minutes or after equilibrium is reached. In further embodiments, the film can have an oil or liquid recovery of 98% by simple mechanical squeezing the top and bottom surface of the film.

The present subject matter can be better understood by referring to the following examples.

EXAMPLES

Example 1

HDPE-PP Blended Porous Thin Films 0.75 g of HDPE and 0.75 g of PP are taken in a round-bottomed flask. 50 ml of isomeric mixtures of xylenes is added to the round-bottomed flask and allowed to stir. The reaction mixture is heated at 130° C. till a clear solution is achieved. Usually, the polymer is dissolved in 10-15 minutes. The round-bottomed flask is connected to a reflux condenser to avoid solvent loss. Add 3 g of sodium chloride size ranging between 150 µm and 200 µm. Allow the polymer reaction mixture to stir until a uniform dispersed solution is achieved.

Simultaneously, a plain glass plate of size 5 cm×5 cm is heated to 120° C. Then it is placed on the customized spin coater chuck and the polymer reaction mixture is poured onto the hot glass surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The glass plate is removed from the chuck and placed in a hot air oven at 160° C. for 25 minutes. Then the thin film is peeled off easily using a tweezer.

Wash the film in water for 5 minutes to remove the cavity-forming agent, sodium chloride, to obtain a thin film layer with pores, macro-voids, and cavities. It is noted that the reaction hotplate stirrer and spin coater are placed side-by-side to avoid solvent exposure to the environment, and the whole setup is kept inside the fume hood. The spin coater drain is connected to a receiver.

The Tensile strength of HDPE-PP blended porous thin films shown in this example 1 was measured and listed in the Tables 1 and 2. As per the requirement of the end-user, the as-prepared thin film sorbent can be modified as presented in Table 1, 2, 3, and 4. The optimized values are obtained with 33% porosity, thickness of 7 µm, and tensile strength of 3 MPa. The value of 3 MPa is sufficient to be used in real time applications of the sorbent.

TABLE 1

Porosity vs Strength comparison for HD-PP porous thin film with no cavities

| SN | Porosity % | [1]Thickness (µm) | [2]Temperature ° C. | Time min | Strength MPA |
|---|---|---|---|---|---|
| 1 | 78 | 20 | 25 | 0 | [3]ND |
| 2 | 73 | 18 | 160 | 5 | ND |
| 3 | 67 | 16 | 160 | 10 | 1 |
| 4 | 61 | 14 | 160 | 15 | 4 |
| 5 | 33* | 7 | 160 | 20 | 8 |
| 6 | 7 | 5 | 160 | 25 | 11 |
| 7 | <1 | 5 | 165 | 5 | 12 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size ranges from 0.5 µm to 2 µm.

TABLE 2

Porosity vs Strength comparison for HD-PP porous thin film with cavities (P:S 1:2)

| SN | Porosity % | [1]Thickness (µm) | [2]Temperature ° C. | Time min | Strength MPA |
|---|---|---|---|---|---|
| 1 | 78 | 20 | 25 | 0 | [3]ND |
| 2 | 73 | 18 | 160 | 5 | ND |
| 3 | 67 | 16 | 160 | 10 | 1 |
| 4 | 61 | 14 | 160 | 15 | 1 |
| 5 | 33* | 7 | 160 | 20 | 3 |
| 6 | 7 | 5 | 160 | 25 | 6 |
| 7 | <1 | 5 | 165 | 5 | 7 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size ranges from 0.5 µm to 2 µm.

Example 2

HDPE: PP: UHMWPE Thin Film

UHMWPE can be added to strengthen the thin films. 0.6375 g of HDPE, 0.6375 g of PP, and 0.225 g of UHMWPE are taken in a round-bottomed flask. 50 ml of p-xylene is added to the round-bottomed flask and allowed to stir. The reaction mixture is heated at 130° C. till a clear solution is achieved. Usually, the polymer is dissolved in 10-15 minutes. The round-bottomed flask is connected to a reflux condenser to avoid solvent loss. Add 3 g of sodium chloride size ranging between 150 µm and 200 µm. Allow the polymer reaction mixture to stir till a uniform dispersed solution is achieved.

Simultaneously, a plain glass plate of size 5 cm×5 cm is heated to 120° C. Then it is placed on the customized spin coater chuck and the polymer reaction mixture is poured onto the hot glass surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The glass plate is removed from the chuck and placed in a hot air oven at 160° C. for 25 minutes. Then the thin film is peeled off easily using a tweezer.

Wash the film in water for 5 minutes to remove the cavity-forming agent, sodium chloride, to obtain a macro-porous thin film layer. It is to note that the reaction hotplate stirrer and spin coater are placed side-by-side to avoid solvent exposure to the environment, and the whole setup is kept inside the fume hood. The spin coater drain is connected to a receiver.

UHMWPE is added to strengthen the thin films. When it is added at 15 wt %, the strength is enhanced by three times. As UHMWPE is a PE, it does not create a compatibility problem when used with HDPE or other PEs. Instead, on the addition of UHMWPE, the viscosity of the solution is increased. Example 2, Table 3, and Table 4 reflect the results using UHMWPE

TABLE 3

Porosity vs Strength comparison for HDPP-UH porous thin film with cavities (P:S 1:2)

| SN | Porosity % | [1]Thickness (μm) | [2]Temperature ° C. | Time (min) | Strength MPA |
|---|---|---|---|---|---|
| 1 | 80 | 20 | 25 | 0 | [3]ND |
| 2 | 74 | 18 | 160 | 5 | ND |
| 3 | 68 | 16 | 160 | 10 | 1 |
| 4 | 60 | 14 | 160 | 15 | 3 |
| 5 | 32* | 7 | 160 | 20 | 6 |
| 6 | 7 | 5 | 160 | 25 | 10 |
| 7 | <1 | 5 | 165 | 5 | 11 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size range from 0.5 μm to 2 μm.

TABLE 4

Porosity vs Strength comparison for HDPP-UH porous thin film with no cavities

| SN | Porosity % | [1]Thickness (μm) | [2]Temperature ° C. | Time min | Strength MPA |
|---|---|---|---|---|---|
| 1 | 80 | 20 | 25 | 0 | [3]ND |
| 2 | 74 | 18 | 160 | 5 | ND |
| 3 | 68 | 16 | 160 | 10 | 1 |
| 4 | 60 | 14 | 160 | 15 | 5 |
| 5 | 32* | 7 | 160 | 20 | 10 |
| 6 | 7 | 5 | 160 | 25 | 15 |
| 7 | <1 | 5 | 165 | 5 | 28 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size range from 0.5 μm to 2 μm.

Example 3

LDPE: PP Thin Film 1.5 g of LDPE and 1.5 g of PP are taken in a round-bottomed flask. 50 ml of p-xylene is added to the round-bottomed flask and allowed to stir. The reaction mixture is heated at 130° C. till a clear solution is achieved. Usually, the polymer is dissolved in 10-15 minutes. The round-bottomed flask is connected to a reflux condenser to avoid solvent loss. Add 6 g of sodium chloride size ranging between 150 μm and 200 μm. Allow the polymer reaction mixture to stir till a uniform dispersed solution is achieved.

Simultaneously, a plain glass plate of size 5 cm×5 cm is heated to 120° C. Then it is placed on the customized spin coater chuck and the polymer reaction mixture is poured onto the hot glass surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The glass plate is removed from the chuck and placed in a hot air oven at 160° C. for 25 minutes. Then the thin film is peeled off easily using a tweezer.

Wash the film in water for 5 minutes to remove the cavity-forming agent, sodium chloride, to obtain a macro-porous thin film layer. It is to note that the reaction hotplate stirrer and spin coater are placed side-by-side to avoid solvent exposure to the environment, and the whole setup is kept inside the fume hood. The spin coater drain is connected to a receiver.

Example 4

LDPE: LLDPE: PP: HDPE Thin Film 0.75 g of LDPE, 0.75 g of LLDPE, 0.75 g of PP, and 0.75 g of HDPE are taken in a round-bottomed flask. 50 ml of isomeric mixtures of xylenes is added to the round-bottomed flask and allowed to stir. The reaction mixture is heated at 130° C. till a clear solution is achieved. Usually, the polymer is dissolved in 10-15 minutes. The round-bottomed flask is connected to a reflux condenser to avoid solvent loss. Add 6 g of sodium chloride size ranging between 150 μm and 200 μm. Allow the polymer reaction mixture to stir till a uniform dispersed solution is achieved.

Simultaneously, a plain glass plate of size 5 cm×5 cm is heated to 120° C. Then it is placed on the customized spin coater chuck and the polymer reaction mixture is poured onto the hot glass surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The glass plate is removed from the chuck and placed in a hot air oven at 160° C. for 25 minutes. Then the thin film is peeled off easily using a tweezer.

Wash the film in water for 5 minutes to remove the cavity-forming agent, sodium chloride, to obtain a macro-porous thin film layer. It is to note that the reaction hotplate stirrer and spin coater are placed side-by-side to avoid solvent exposure to the environment, and the whole setup is kept inside the fume hood. The spin coater drain is connected to a receiver.

Example 5

Oil Sorption Studies

The oil sorption studies conducted including dripping kinetics, saturation kinetics and comparison with commercial sorbents as shown in table 5, 6, and 7, respectively were done using the thin film of Example 1. Dripping kinetics is the amount of oil dripped from the thin film with respect to time. When a thin film is placed or dipped in oil, it absorbs oil until it reaches saturation. After it reaches equilibrium, the thin film is taken out, and loosely connected oil is allowed to drain from it. Initially, oil will drip more and as time passes, the dripping decreases, and after some time some oil is retain by the film and oil is not dripped. This is termed as retention capacity of the thin film. The as-prepared thin film sorbent reaches its equilibrium uptake value after 5 minutes of dripping, i.e., after 5 minutes there will be no more dripping of oil from the sorbent.

Saturation kinetics is the time taken by the thin film to reach a saturation point, whereafter the oil cannot be absorbed more. In short, it is the maximum capacity of the oil absorbed by the thin film with respect to time. The as-prepared thin film sorbent reaches its saturation value within 5 minutes of sorption.

Regarding a comparison of the as-prepared oil sorbent film with commercial sorbents, an area of 16 cm$^2$ of 3M and Chemtex commercial sorbents were cut and were compared with an area of 16 cm$^2$ size of the thin film of example 1. The equilibrium oil uptake value of the current porous sorbent was found to be 65 g/g, which is much higher than the commercial sorbent pads made of nonwoven polypropylene fabric.

TABLE 5

Retention capacity of example 1 (HD:PP) thin film using engine oil[1].

| S.N. | Dripping time (min) | Oil uptake capacity[1] (g/g) |
|---|---|---|
| 1 | 0 | 150 |
| 2 | 0.5 | 120 |
| 3 | 1 | 105 |
| 4 | 2 | 100 |
| 5 | 5 | 95 |
| 6 | 15 | 95 |

[1]Oil uptake capacity with an error of ±10%;
[2]Density = 0.89 kg/m$^3$

TABLE 6

Saturation capacity profile of example 1 (HD:PP) thin film using engine oil

| S.N. | Saturation time (min) | Oil uptake capacity* (g/g) | Oil uptake capacity** (g/g) |
|---|---|---|---|
| 1 | 0.5 | 65 | 50 |
| 2 | 1 | 100 | 70 |
| 3 | 2 | 130 | 80 |
| 4 | 5 | 150 | 95 |
| 5 | 15 | 150 | 95 |

*Oil uptake measured immediately after taking out the film from an oil bath
**Oil uptake measured after equilibrium is reached (after dripping for 5 mins)

TABLE 7

Comparison of oil uptake capacity[1] with commercial sorbents using engine oil

| S.N. | Sorbent (g/g) | 3M HP-255 (g/g) | Chemtex BP9W (g/g) |
|---|---|---|---|
| 1* | 150 | 27 | 22 |
| 2** | 95 | 23 | 17 |

[1]Oil uptake capacity with an error of ±10%
*Oil uptake measured immediately after taking out the film from an oil bath
**Oil uptake measured after equilibrium is reached (after dripping for 5 mins)

Separation Efficiency: The sorbent film of 16 cm$^2$ and a thickness of 7 μm was used to measure oil water separation efficiency. Initially, the film was fixed on a sintered glass filtration unit and a solution of 1000 ppm oil suspended in water was allowed to pass through the filtration unit. The results were reported in Table 8 using example 1. The film had a 100% oil water separation efficiency with a maximum capacity of 400 ppm per cm$^2$ of sorbent film.

TABLE 8

Oil water separation efficiency

| SN | Oil in water (ppm) | Efficiency % |
|---|---|---|
| 1 | 1000 | 40 |
| 2 | 800 | 50 |
| 3 | 600 | 66 |
| 4 | 500 | 80 |
| 5 | 400 | 100 |
| 6 | 200 | 100 |
| 7 | 100 | 100 |
| 8 | 1 | 100 |

It is to be understood that the present processes, compositions, and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A microporous thin film prepared according to a process comprising:
   collecting a plastic waste stream;
   shredding plastic in the plastic waste stream into pieces, thereby obtaining shredded plastic;
   rolling and mixing the shredded plastic in water to obtain a mixture;
   separating polyolefins from other plastics in the mixture using a float-sink method to obtain separated polyolefins;
   dissolving the separated polyolefins in an organic solvent to obtain a solution;
   adding a cavity forming agent to the solution until the cavity forming agent is well-dispersed therein;
   applying the solution onto a solid substrate through spin-coating to obtain a substrate coated with a thin film;
   subjecting the thin film to heat thereby strengthening the thin film;
   peeling the thin film off the substrate to obtain a peeled thin film; and extracting the cavity forming agent from the peeled thin film by dissolving the peeled thin film in a suitable solvent, thereby obtaining a microporous thin film with macro-voids and cavities.

2. The microporous thin film of claim 1, wherein the microporous thin film with macro-voids and cavities is used as an oil sorbent.

3. The microporous thin film of claim 1, wherein the separated polyolefins are selected from the group consisting of polypropylene (PP), high density polyethylene (HDPE), low density polyethylene (LDPE), linear low density polyethylene (LLDPE), and mixtures or combinations thereof.

4. The microporous thin film of claim 1, wherein the solid substrate before the spin coating is pre-heated to a temperature of about 80° C. to about 160° C.

5. The microporous thin film of claim 1, wherein the spin coating occurs for about 1 to about 10 minutes and is conducted at an rpm of about 100 to about 6000.

6. The microporous thin film of claim 5, wherein the spin coating is conducted at an rpm of about 2000 to about 3000 to obtain an ultra-thin film thickness of about 100 nm.

7. The microporous thin film of claim 5, wherein the spin coating is conducted at an rpm of about 1500 to about 2000 to obtain a thin film thickness of about 500 nm to about to 1 µm.

8. The microporous thin film of claim 5, wherein the spin coating is conducted at an rpm of about 1000 to about 1500 to obtain a thin film thickness of about 1 µm to about to 100 µm.

9. The microporous thin film of claim 1, wherein the suitable solvent is selected from the group consisting of an aqueous solvent selected from the group consisting of pure water, distilled water, deionized water, acidic aqueous solution, basic aqueous solution, and a buffer; an inorganic acidic solvent; an inorganic basic solvent; an organic solvent; an ionic liquids; and a mixture or combination thereof.

10. The microporous thin film of claim 1, wherein the organic solvent is selected from the group consisting of p-xylene, m-xylene, o-xylene, an isomeric mixture of xylenes, toluene, other compatible aromatic hydrocarbons, and a mixture or combination thereof.

11. The microporous thin film of claim 1, wherein the separated polyolefins are dissolved in the organic solvent in a ratio of about 1 mg/ml to about 200 mg/ml.

12. The microporous thin film of claim 1, wherein the cavity forming agent is selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a mixture or combination thereof.

13. The microporous thin film of claim 1, wherein the cavity forming agent is added to the solution in a ratio of separated polyolefins to cavity forming agent of about 1:0 w/w % to about 1:4 w/w %.

14. The microporous thin film of claim 1, wherein the solid substrate is selected from the group consisting of glass, copper, silicon, alumina, and another metal surface.

15. The microporous thin film of claim 1, wherein the microporous thin film has about 400 to about 800 swellable 3D cavities per $cm^2$.

16. The microporous thin film of claim 1, comprising a blend of the separated polyolefins selected from the group consisting of polypropylene (PP), high density polyethylene (HDPE), low density polyethylene (LDPE), linear low density polyethylene (LLDPE), and mixtures or combinations thereof.

17. The microporous thin film of claim 1, having a thickness of about 2 µm to about 100 µm, a tensile strength of about 3 MPa to about 80 MPa, and a porosity ranging from about 1% to about 82%.

* * * * *